Aug. 7, 1923.
A. WEIDLICH
APPARATUS FOR GRINDING TWIST DRILLS
Filed May 31, 1921
1,463,985
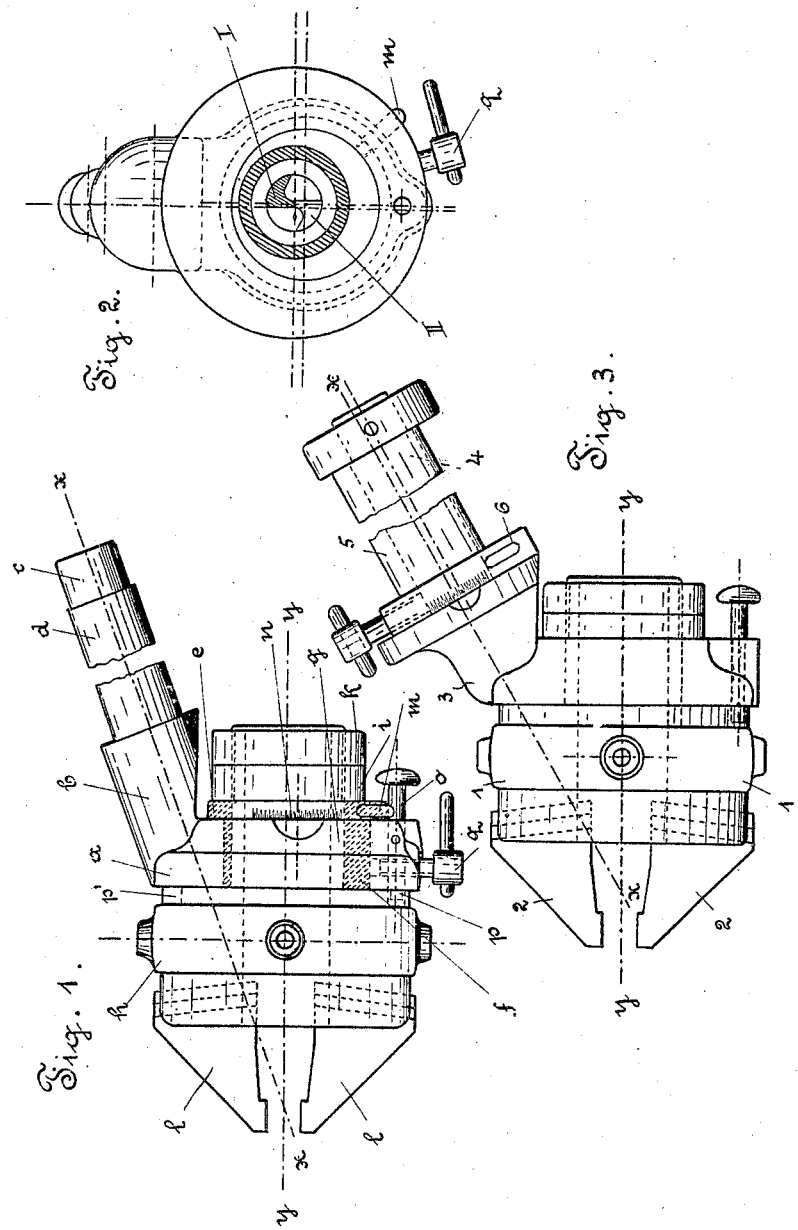

Patented Aug. 7, 1923.

1,463,985

UNITED STATES PATENT OFFICE.

ARTHUR WEIDLICH, OF VIENNA, AUSTRIA.

APPARATUS FOR GRINDING TWIST DRILLS.

Application filed May 31, 1921. Serial No. 473,855.

*To all whom it may concern:*

Be it known that I, ARTHUR WEIDLICH, mechanical engineer, residing at Vienna, in the Province of Lower-Austria, Republic of Austria, have invented certain new and useful improvements in Apparatus for Grinding Twist Drills (for which I have made application in Austria, Dec. 11, 1915, and Oct. 18, 1918; Germany, June 19, 1916; Great Britain, May 24, 1917; and Hungary, Sept. 1, 1916); and I do hereby declare the following to be a full, clear, and exact description of the invention, such as will enable others skilled in the art to which it appertains to make and use the same.

It is known that the so-called lips of twist drills must be ground to an exactly defined conical figure in order to obtain the desired backing-off grinding. For this purpose it is required to adjust the axis of the drill to a determined angle to the grinding surface and furthermore to slow the drill round an axis, which does not intersect, but crosses its own axis, in a different plane, the distance apart of the planes in which the two axes are situated having been made adjustable in accordance with the desired backing-off grinding.

The object of this invention is to provide a swinging guide for the chuck of apparatus for grnding twist drills, which guide allows of exact adjustment, and suitable guidance, of the drill during the grinding operation. According to this invention the chuck is eccentrically and adjustably mounted in the swinging guide, so as to allow of variation, to the requisite extent, of the distance between the planes of the two crossing axes (the axis of the swinging guide and the axis of the chuck) by displacement of the eccentric.

The accompanying drawing illustrates a way in which this invention can be carried into effect, Fig. 1 being a side elevation and Figure 2 a front elevation; partly in section. Fig. 3 shows another mode of execution.

The swinging-guide is formed as a ring $a$, having an inclined stem $b$, the cylindrical pivot $c$, of which is supported in a bearing $d$, in such a manner, that the ring $a$ can be slewed round the axis $x$—$x$, of the pivot $c$. A bush $f$, provided with a flange $e$, is inserted in the ring $a$ and in the eccentric bore of the bush $f$, is arranged the sleeve $g$ of the chuck-body $h$, the screw-threaded rear end of which carries a nut $i$, and lock-nut $k$, for preventing axial displacements.

The chuck jaws $l$, are supported and guided in the body of the chuck $h$. The axis $y$—$y$, of the chuck is not intersected by the axis of oscillation $x$—$x$ but these two axes cross one another in different planes (see Figure 2) and the distance apart of such planes should be adjustable as already mentioned. In order to effect this adjustment it is only necessary to turn the eccentrical bush $f$, which carries the chuck $h$, $l$.

To the flange $e$, of the bush $f$, is secured a handle $m$, by means of which the said bush can be turned within the ring $a$, the periphery of the flange $e$, being provided with a scale $n$, by means of which the extent of rotary movement can easily be adjusted. If the chuck $h$, be prevented from partaking of this rotary movement of the bush $f$, it is obvious that its axis $y$—$y$, will be displaced in one direction or the other, and parallel to itself in accordance with the direction of rotation, so that the distance apart of the planes in the axis $y$—$y$ and the axis $x$—$x$, are respectively situated is thereby increased, or diminished.

For the connection of the ring $a$, with the body of the chuck $h$, a bolt $o$, is provided which may be axially displaced in the ring $a$. The forward end of this bolt $o$, enters a recess $p$, in the body of the chuck and thus effects the locking. The recess $p$, is of such a character that it does not prevent the adjustment of the chuck being effected by turning the eccentric bush $f$. When the locking is released by the withdrawal of the bolt $o$, the chuck may be turned through an angle of 180°, and be again locked in this new position by the insertion of the bolt $o$, into another recess $p^1$. It is necessary to allow of turning the chuck through an angle of 180° in order to be in a position to operate successively on the two lips $l$, $ll$ (Figure 2) when the drill is rigidly held in the chuck.

A set-screw $q$, is used for fastening the eccentric bush $f$, in the required position.

It will be evident that the details of construction of the device may be varied without departing from the nature of this invention.

It is possible to secure the same effect if not the chuck holding the drill is adjustably arranged, in the swinging guide but if the turning axis of the swinging guide is adjustably situated as it is represented by way of example in Fig. 3.

The swinging guide 1 in which the chuck 2 is inadjustably arranged is connected by means of the intermediate piece 3 with a pivot 4 which is carried by an eccentrical sleeve 5. This sleeve 5 itself lies in a bearing of the frame of the machine not represented and may be turned within the bearing by means of a ring 6 connected with it and provided with a handle 7. By turning the ring 6 together with the sleeve 5 in the bearing the axis x—x of the pivot 4 is displaced parallel to itself with regard to the axis y—y of the chuck 2 so that the crossing distance of these two axes may be varied.

What I claim is:

1. In an apparatus for grinding twist drills, the combination of a swinging guide, a pivot fixed thereto and a supporting bearing associated therewith, a chuck for holding the drill and rotatably supported by the swinging guide, the axis of the pivot of the swinging guide being eccentric and oblique in relation to the axis of said chuck, the axis of said pivot and the axis of the chuck not being contained in a common plane, means for displacing one of the two axes parallel to itself for varying the distance between the two axes, and means for fixing the chuck in its position in relation to the swinging guide.

2. In an apparatus for grinding twist drills, the combination of a swinging guide, a pivot fixed thereto and a supporting bearing associated therewith, a chuck for holding the drill, a cylindrical projection fixed to said chuck, a sleeve with an eccentric bearing for the cylindrical projection of said chuck, said sleeve being carried within said swinging guide and adjustable therein by rotating in order to displace the axis of the drill parallel to itself, the axis of the pivot of the said swinging guide being eccentric and oblique in relation to the axis of said chuck, the axis of said pivot and the axis of the chuck not being contained in a common plane.

3. In apparatus for grinding twist drills, the combination of a swinging guide provided with an eccentric and oblique pivot lying in a bearing, a chuck holding the drill and provided with a cylindrical projection, this projection being carried by the swinging guide and being rotatable through an angle of 180°, the axis of the swinging guide crossing the axis of its turning pivot, an eccentrical sleeve rotatably arranged in the bearing of the pivot of the swinging guide and acting as bearing for the said pivot and means for fixing the sleeve in its position in proportion to the swinging guide.

4. Apparatus of the class described, comprising a grinding element, means for supporting the drill in grinding position, means whereby said drill may be rotated bodily about an axis, said axis and the axis of said drill not lying in a common plane, and means for regulating the perpendicular distance between said axes.

5. Apparatus of the class described, comprising a grinding element, means for supporting the drill in grinding position, means whereby said drill may be rotated bodily about an axis, said axis and the axis of said drill not lying in a common plane, and an eccentric associated with said drill whereby the axis of the drill may be shifted parallel to itself and the distance between said axes varied.

In testimony whereof I affix my signature.

ARTHUR WEIDLICH.

Witnesses:
SIEGFRIED NEUTRA,
JOHANN LUCZ.